US012596345B2

(12) United States Patent
Elford et al.

(10) Patent No.: US 12,596,345 B2
(45) Date of Patent: Apr. 7, 2026

(54) FORMING STYLUS TOOL DESIGN AND TOOLPATH GENERATION MODULE FOR 3 AXIS COMPUTER NUMERICAL CONTROL MANUFACTURING PROCESSES

(71) Applicant: THE BOEING COMPANY, Chicago, IL (US)

(72) Inventors: Michael Charles Elford, Brisbane (AU); Andrew Jon Eugene Stephan, Brisbane (AU)

(73) Assignee: THE BOEING COMPANY, Chicago, IL (US)

( * ) Notice: Subject to any disclaimer, the term of this patent is extended or adjusted under 35 U.S.C. 154(b) by 958 days.

(21) Appl. No.: 16/888,972

(22) Filed: Jun. 1, 2020

(65) Prior Publication Data
US 2021/0373524 A1 Dec. 2, 2021

(51) Int. Cl.
| | |
|---|---|
| *G05B 19/25* | (2006.01) |
| *B21D 31/00* | (2006.01) |
| *B23C 5/10* | (2006.01) |
| *G05B 19/19* | (2006.01) |
| *G05B 19/4093* | (2006.01) |
| *G05B 19/4099* | (2006.01) |

(52) U.S. Cl.
CPC ........... *G05B 19/25* (2013.01); *B21D 31/005* (2013.01); *B23C 5/10* (2013.01); *G05B 19/195* (2013.01); *G05B 19/4093* (2013.01); *G05B 19/4099* (2013.01); *B23C 2210/54* (2013.01); *G05B 2219/35097* (2013.01)

(58) Field of Classification Search
CPC ...... B21D 22/14; B21D 31/005; B21D 31/06;
B23C 5/10; G05B 19/4093; G05B 2219/35097; G05B 19/25; C21D 7/04; C21D 7/08; B24B 39/006
See application file for complete search history.

(56) References Cited

U.S. PATENT DOCUMENTS

| | | | | |
|---|---|---|---|---|
| 4,349,058 A | * | 9/1982 | Comparetto ....... | A61B 17/1604 30/302 |
| 5,119,667 A | * | 6/1992 | Hollis .................... | B21D 1/065 72/705 |

(Continued)

FOREIGN PATENT DOCUMENTS

EP 2878404 A1 6/2015

OTHER PUBLICATIONS

JP 2013-020436A, Sowa et al. Jan. 2013.*

(Continued)

*Primary Examiner* — Edward T Tolan
(74) *Attorney, Agent, or Firm* — Mary D. Lawlor; Carroll, Hoette & Butscher, LLC

(57) ABSTRACT

A method of toolpath generation is provided whereby the tool may be any smooth convex axisymmetric shape. The tool includes a tool body extending between a shank and a head. The shank is configured to be mounted in a collet which may optionally rotate. In the case of a stylus tool, the head has an axisymmetric forming surface used to press metal. In the case of a routing tool, the head has cutting surfaces which are enveloped by a smooth convex axisymmetric surface and the tool is used for milling a part. In a least one embodiment the tool is a stylus tool which has a forming surface that has been generated from a portion of a clothoid curve.

28 Claims, 8 Drawing Sheets

(56) References Cited

U.S. PATENT DOCUMENTS

| | | | | |
|---|---|---|---|---|
| 5,127,248 A * | 7/1992 | Sanseau | | B21D 7/14 |
| | | | | 72/157 |
| 5,923,561 A | 7/1999 | Higasayama et al. | | |
| 6,148,880 A * | 11/2000 | Dehde | | B27C 1/005 |
| | | | | 30/477 |
| 6,221,083 B1 * | 4/2001 | Mayer | | A61B 17/062 |
| | | | | 606/139 |
| 6,660,106 B1 * | 12/2003 | Babel | | B21D 22/14 |
| | | | | 228/114 |
| 7,251,976 B2 * | 8/2007 | Field | | B21C 3/00 |
| | | | | 72/157 |
| 8,057,286 B2 * | 11/2011 | Walsh | | B24D 15/023 |
| | | | | 451/523 |
| 8,733,143 B2 * | 5/2014 | Kiridena | | B21D 3/02 |
| | | | | 72/126 |
| 9,168,580 B2 * | 10/2015 | Cao | | B21D 31/005 |
| 9,555,486 B2 * | 1/2017 | Baba | | B23C 5/10 |
| 9,884,379 B1 * | 2/2018 | Budda | | B23C 5/10 |
| 10,105,815 B2 * | 10/2018 | Guo | | C21D 7/04 |
| 10,144,048 B2 * | 12/2018 | Kiridena | | B21D 31/005 |
| 10,162,329 B2 * | 12/2018 | Ndip-Agbor | | G05B 19/29 |
| 2014/0149053 A1 * | 5/2014 | Sun | | C23C 8/04 |
| | | | | 29/90.01 |
| 2018/0248061 A1 * | 8/2018 | Bullen | | H02S 50/10 |
| 2019/0099799 A1 * | 4/2019 | Roth | | B21D 31/005 |
| 2020/0384796 A1 * | 12/2020 | Sheth | | B44B 11/04 |

OTHER PUBLICATIONS

JP 2005-276155A, Kimura et al. Oct. 2005.*
JP 2010-253539A, Akase et al. Nov. 2010.*
JP 2011-92960A, Akase May 2011.*
SU 365185A, Russia Oct. 1971.*
DE 102005017659A1, Roleder Oct. 2006.*
Search Report mailed Oct. 15, 2021 for corresponding European Application No. 21173585.7-1012 (5 pages).
Office Action dated Apr. 30, 2025 for CN Application No. 202110412781.5. English translation provided. (19 pages).

* cited by examiner

FORMING STYLUS TOOL DESIGN AND TOOLPATH GENERATION MODULE FOR 3 AXIS COMPUTER NUMERICAL CONTROL MANUFACTURING PROCESSES

BACKGROUND

The subject matter herein relates generally to stylus tools for forming parts and toolpath generation for 3-axis computer numerical control (CNC) manufacturing operations.

Stylus tools are used in part manufacturing processes to form parts from metal. For example, in incremental sheet forming processes, the stylus tool is pressed against the metal sheet as the stylus tool is moved in three-dimensional space to form the part. Known stylus tools are spherical stylus tools having forming surfaces that are hemispherical with a cross-section that is a semicircle. However, known stylus tools are not without disadvantages. For instance, known stylus tools can generate significant "oil canning" (curled areas adjacent to the contact points) due to the large forces at the contact points with the metal sheet and the shape of the forming surfaces.

Standard methods for calculating toolpaths for stylus tools, are, in general, computationally expensive and time consuming to perform. For example, discrete Minkowski sums can be used to generate offset surfaces from which toolpaths are derived, which are computationally expensive and time consuming to perform.

BRIEF DESCRIPTION

In one embodiment, a stylus tool for forming a part is provided. The tool includes a tool body extending between a shank and a head. The shank is configured to be coupled to a collet. The head extends between a base at the shank and a tip. The head has a forming surface between the base and the tip. The forming surface is an axisymmetric surface generated by rotating a curved profile around the axis of the stylus shank, whereby the curved profile has a curvature which increases linearly with path length from the tip.

In another embodiment, a router tool for milling a part is provided. The tool includes a tool body extending between a shank and a head. The shank is configured to be coupled to a collet. The head extends between a base at the shank and a tip. The head has a cutting surface between the base and the tip. The cutting surface is enveloped by an axisymmetric surface generated by rotating a curved profile around the axis of the tool shank, whereby the curved profile has a curvature which increases linearly with path length from the tip.

In another embodiment, a toolpath generation method using a toolpath generation module of a part forming machine, or milling machine, for generating a toolpath using a stylus tool, or router, is provided. The toolpath generation method includes inputting a part shape of a part to be formed or milled. The method inputs a tool shape of the tool based on a forming or cutting surface of a head of the tool between a tip of the head and a base of the head. The tool shape from the tip to the head is generated by rotating a smooth curve profile, around the axis of the tool shank, such that a convex tool head is produced.

In a further embodiment, a toolpath generation method uses a toolpath generation module of a part forming or milling machine, for forming (using a stylus tool) or milling (using a router), for generating a toolpath. The toolpath generation method includes inputting a part shape of a part to be manufactured. The method inputs a tool shape of the tool based on a forming or cutting surface of a head of the stylus or router tool between a tip of the head and a base of the head defined by a curved profile. The curved profile is differentiable and bounds a convex region. The forming surface is axisymmetric for forming of the part, or the cutting surface is axisymmetric for the cutting of the part. The method inputs a tool size of the base of the head of the stylus tool. The method determines a tool offset surface for the part shape based on the tool shape and the tool size and generates the toolpath for forming or cutting the part based on the tool offset surface and the part shape.

In another embodiment, a 3-axis computer numerical controlled machine is provided. This machine can be programmed for milling or for forming. The machine includes a collet being moved by a tool positioner in a three dimensional working space. A controller is operably coupled to the tool positioner for controlling a position of the collet in the working space. The controller includes a toolpath generation module for generating a toolpath for forming or milling of a part. A tool is coupled to the collet and moved with the collet for forming or milling the part. The tool includes a tool body extending between a shank and a head. The shank is coupled to the collet. The head extends between a base at the shank and a tip. The head has a forming or cutting surface between the base and the tip. The forming or cutting surface is axisymmetric for forming or milling of the part. The forming or cutting surface is defined by a curved profile being differentiable and bounding a convex region. The toolpath generation module determines the toolpath for the forming or milling tool based on a tool shape of the tool defined by the forming or cutting surface.

In a further embodiment, a 3-axis computer numerical controlled machine is provided. The machine includes a collet being moved by a tool positioner in a three dimensional working space. A controller is operably coupled to the motor for moving the tool positioner for controlling a position of the collet in the working space. The controller includes a toolpath generation module for generating a toolpath for forming or milling of a part. A stylus or cutting tool is mounted in the collet and moved with the collet for forming or milling the part. The tool includes a tool body extending between a shank and a head. The shank is mounted in the collet. The head extends between a base at the shank and a tip. The head has a forming or cutting surface between the base and the tip. The forming surface or cutting surface is axisymmetric for forming or milling of the part. The forming or cutting surface is defined by rotating a curved profile which is smooth around the axis of the tool shank, such that the tool head bounds a convex region. The toolpath generation module determines the toolpath for the tool based on a tool shape of the tool defined by the forming or cutting surface.

In one embodiment, the shape of the forming or cutting surface of the tool is defined by rotating a parametrically defined curve, such that the radius (distance from the axis of rotation) and height (distance along the axis from the tool tip) are smooth functions of a single parameter, that bounds a convex region, around some axis. For example, an elliptical head can be defined such that the radius is given by $r(t)=\sin(t)$, and the height is given by $z(t)=2\cos(t)$, for $0<t<\pi/2$.

DETAILED DESCRIPTION

Figure 1:
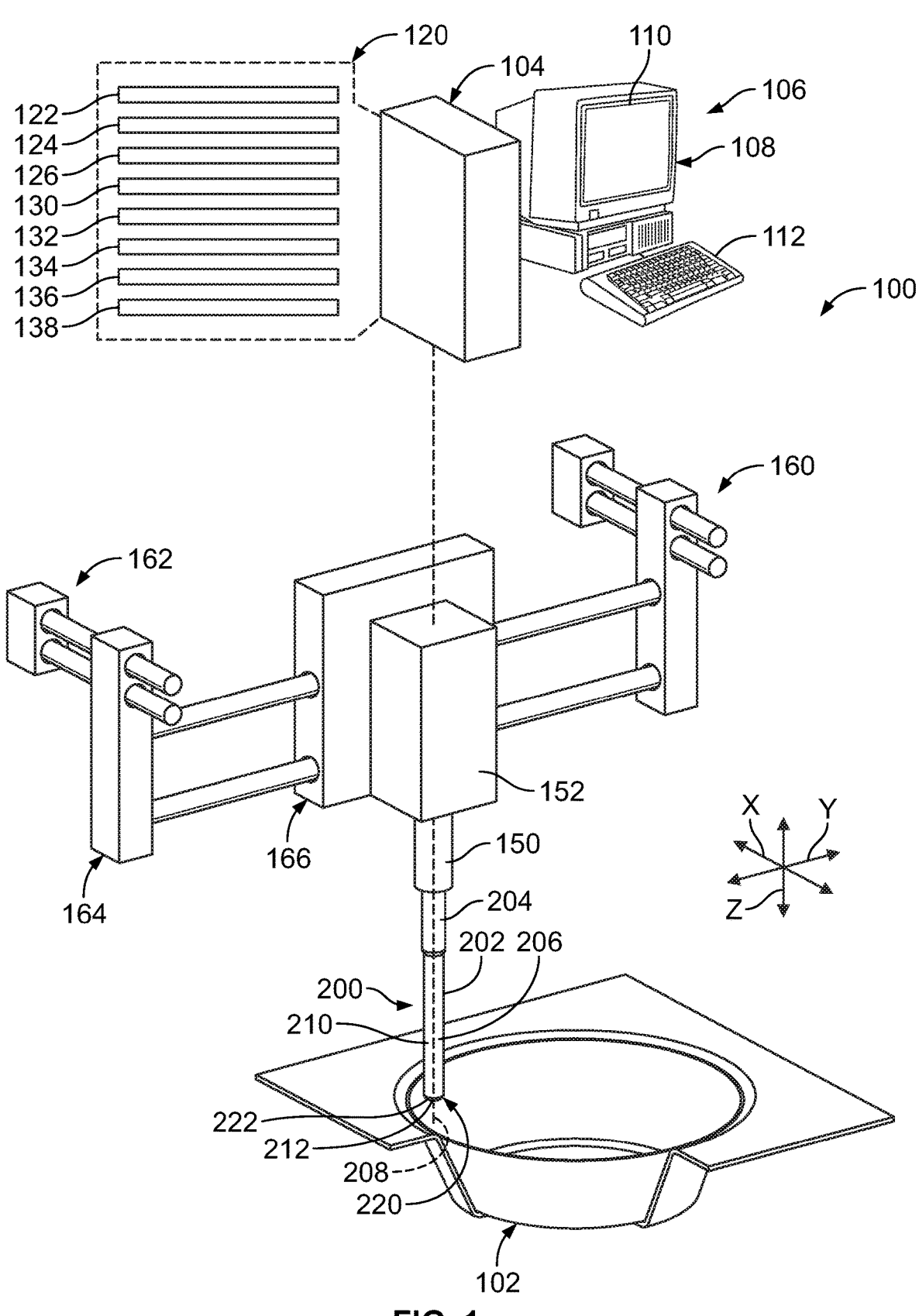
FIG. 1 illustrates a part forming machine for forming a part by forming using a stylus tool in accordance with an exemplary embodiment.

FIG. 1 illustrates a part forming machine 100 for forming a part 102 by forming using a stylus tool 200 in accordance with an exemplary embodiment. In various embodiments, the part forming machine 100 may be an incremental sheet forming machine forming the part by an incremental sheet forming process; however, other types of machines may be provided using other manufacturing processes, such as shear spinning, or milling, in alternative embodiments. The part forming machine 100 includes a controller 104 controlling operation of other components of the part forming machine 100. The controller 104 includes a computer 106 includes a user interface 108 coupled to the computer 106. The user interface 108 includes a display 110 and a user input 112, such as a keyboard, mouse, or other user input device. The controller 104 includes a toolpath generation module 120 for generating a toolpath for forming the part 102 during a forming process. The part forming machine may be a CNC machine in various embodiments. The part forming machine 100 may use a backing support or die to support the part during forming. The backing support may be a female support die or a male support die, as in two point incremental sheet forming. In other various embodiments, the part forming machine 100 may use no backing support die, as in single incremental sheet forming. The part forming machine may be used for dual sided incremental sheet forming, using two stylus tools 200.

The part forming machine 100 includes a collet 150 holding the stylus tool 200. The collet 150 may hold the stylus tool 200 in a vertical orientation; however, the collet may hold the stylus tool 200 in other orientations in alternative embodiments, such as horizontally. The collet 150 may be located above the part for forming the part from above. However, the collet 150 may be located below the part for forming the part from below in alternative embodiments. In various embodiments, the collet 150 may be rotatable. For example, the collet 150 may be coupled to a spindle that is rotated by a motor 152. The motor 152 is operably coupled to the controller 104 and may be controlled based on inputs from the controller 104, such as to control ON/OFF, rotation speed, rotation direction, and the like. The motor 152 may be a stepper motor, a servo motor, or another type of motor. In alternative embodiments, the stylus tool 200 is a non-rotating stylus tool. In such embodiments, the part forming machine 100 may be provided without the motor 152. In further embodiments, the stylus tool 200 may be a cutting tool, such as a router for milling.

The part forming machine 100 includes a tool positioner 160 operated to move the collet 150 and the stylus tool 200 in a three dimensional working space for forming the part 102. In an exemplary embodiment, the tool positioner 160 includes an X-positioner 162, a Y-positioner 164, and a Z-positioner 166. For example, the X-positioner 162 may be a saddle or carriage slidable on rails to position the motor 152 and the collet 150 in an X-direction, the Y-positioner 164 may be a saddle or carriage slidable on rails to position the motor 152 and the collet 150 in a Y-direction, and the Z-positioner 166 may be a saddle or carriage slidable on rails to position the motor 152 and the collet 150 in a Z-direction. Other types of tool positioners 160 may be used in alternative embodiments. For example, the tool positioner 160 may be a multi-axis positioner, such as a robot arm, in other various embodiments. The tool positioner 160 is operably coupled to the controller 104 and may be controlled based on a toolpath generated by the toolpath generation module 120.

The stylus tool 200 includes a tool body 202 extending between a shank 204 and a head 206. The shank 204 and the head 206 may be an integral structure. The shank 204 and the head 206 extend along a tool axis 208. The shank 204 is mounted in the collet 150. The shank 204 has a shank diameter configured to be loaded into the collet 150. The head 206 extends between a base 210 at the shank 204 and a tip 212. The tip 212 is provided at the bottom of the tool body 202 along the tool axis 208. The base 210 has a shaft diameter, which may be equal to the shank diameter or may be larger or smaller than the shank diameter.

The head 206 has a forming surface 220 between the base 210 and the tip 212. The forming surface 220 is pressed against the sheet as the stylus tool is moved along a toolpath to form the part. The surface 220 may be a cutting surface used for cutting the part, such as in a milling process. The cutting surface is enveloped by an axisymmetric surface generated by rotating a curved profile around the axis of the tool shank. The forming surface 220 is defined by a curved profile 222. For example, the forming surface 220 is a surface of revolution generated by revolving the curved profile 222 around the axis 208. The curved profile 222 is differentiable (e.g., smooth). The curved profile 222 may be continuous. The curved profile 222 may be uninterrupted. The curved profile 222 bounds a convex region of the head 206. The forming surface 220 is axisymmetric about the tool axis 208. In an exemplary embodiment, the curved profile 222 has a curvature changing linearly with a curve length of the curved profile 222 of the forming surface 220. The curved profile 222 may have a decreasing radius of curvature from the tip 212 to the base 210. For example, the curved profile 222 may be part of a clothoid. The curved profile 222 may be defined by an equation $R*L=A$, where R is radius of curvature, L is length along the curve length and A is a scale factor. In various embodiments, the curve profile 222 is non-circular. For example, the curved profile 222 may be part of a filleted rectangle, or generated by parabolic, elliptical, cycloidal curves, or may be defined by other non-circular shapes, such as a power law curve, and the like. Some non-hemispherical tools can improve the overall geometric accuracy of formed parts. In an exemplary embodiment, the part forming machine 100 uses stylus tools defined by a shape having a parametric profile. The part forming machine 100 is configured to use different types of stylus tools 200 having forming surfaces 220 generated from different profile curves 222 (for example, different shape and different size). The part forming machine 100 is able to generate toolpaths for the various different style of stylus tools 200. In various embodiments, the curve may be delayed from the tool axis 208, such as including a flat surface at the tip 212 before transitioning into the curved profile 222. The curved profile 222 may extend between the flat surface and the base 210.

The toolpath generation module 120 generates a toolpath for forming of the part 102 using the stylus tool 200. The toolpath is based on the shape of the part 102 being formed. The toolpath is based on the size and shape of the forming surface 220 of the stylus tool 200. The size and shape of the forming surface 220 may be selected to improve the part geometry of the part 102, such as selected to reduce or minimize "oil canning" and spring back effects commonly observed in incremental sheet forming processes. The size and shape of the forming surface 220 may be selected based on the shape of the part 102, such as the slope of the surfaces of the part 102, the curvature of the surfaces of the part 102, and the like.

The toolpath generation module 120 includes a tool shape input 122, a tool size input 124, and a part shape input 126. The toolpath generation module 120 may include other inputs, such as a tip curve delay input 130, a sheet thickness input 132, a feedrate input 134, a toolpath direction input 136, a toolpath step size input 138, or other inputs. The toolpath generation module 120 determines a tool offset surface for the stylus tool 200 from the desired part shape. The tool offset surface may be affected by the tool shape, the tool size, the thickness of the sheet, and the like.

The tool shape input 122 is based on the shape of the curved profile 222 used to define the forming surface 220 of the stylus tool 200. The tool shape input 122 may include a menu of different tool shapes, which may be selected by the user at the user interface 108, or may include an input into a text box at the user interface 108. For example, the tool shapes may be selected from a list of tool shapes including those generated by rotating part of a circle, part of a clothoid, part of a filleted rectangle, part of a parabola, part of a power law curve, part of an ellipse, or other smooth curves that bound convex regions. The toolpath generation module 120 includes mathematical formulae associated with the tool shape, which is used to generate the toolpath. This mathematical formulae may be implicit, explicit, parametric, or the like.

The tool size input 124 is based on the size of the forming surface 220 of the stylus tool 200. The tool size input 124 may include a menu or input box to identify the tool size of the stylus tool 200. For example, the tool size may be based on the diameter of the stylus tool 200, such as at the base 210. The base 210 may be cylindrical in various embodiments. The base 210 may be filleted or have other shapes to transition to the shank 204. The base 210 may have a different shape (for example, surface of revolution generated from the curve tangent to the profile curve at the end of the forming surface 220) compared to the tool shape and thus defines a transition region between the forming surface 220 and the shank 204. The base 210 is not used for part forming. The mathematical formulae associated with the tool shape (for example, variables, constants, equations, and the like) affect the tool size. For a given tool shape (for example, spherical, clothoid, and the like) the tool size affects the curvature of the curved profile 222.

The part shape input 126 is based on the geometry of the part 102 being formed. The part shape input 126 may be based on design specifications for the part 102. The part shape may be a digital file of an object generated by a design program, such as a computer aided design (CAD) program. The part shape input 126 may include a file selection, such as a file directory or browser to select the part shape. The part shape input 126 may include an orientation selection, such as to select the orientation of the part, such as relative to a horizontal plane. The orientation selection may define the top of the part, the bottom of the part, sides of the part, and the like. The orientation selection may be based on the part being formed from an interior or an exterior of the part 102.

The tip curve delay input 130 is based on the tip 212 having a flat surface at the tip 212. As such, the curved profile 222 is delayed at the tip 212. The tip curve delay input 130 may be a distance, such as half a width of the shank 204, which is a selection from a menu or an input into a text box at the user interface 108.

The sheet thickness input 132 affects the tool offset determined by the toolpath generation module 120 to generate the toolpath. The sheet thickness input 132 may be a distance. The sheet thickness input 132 may be a selection from a menu or an input into a text box at the user interface 108.

The feedrate input 134 may affect the forming process. The feedrate input 134 is the speed at which the tool moves along the toolpath. The feedrate input 134 may be expressed in mm per minute, for example. The feedrate input 134 may be a selection from a menu or an input into a text box at the user interface 108.

The toolpath direction input 136 is used by the toolpath generation module 120 to generate the toolpath. The forming process may be a continuous process to form the part 102. The forming process may be performed in layers. The toolpath direction input 136 may define the toolpath flow from the start to the finish of part forming. The toolpath direction input 136 may include different types of forming paths, such as a discrete (for example, stepped) type of forming, a spiral type forming, and the like. In various embodiments, the toolpath direction may be altered or changed for each of the steps to counteract twisting effects created by the forming process. The toolpath direction input 136 may be a selection from a menu or an input into a text box at the user interface 108.

The toolpath step input 138 may define a distance between the steps or layers of the part forming. The toolpath step input 138 may be a distance. The toolpath step input 138 may be a selection from a menu or an input into a text box at the user interface 108.

Figure 2:
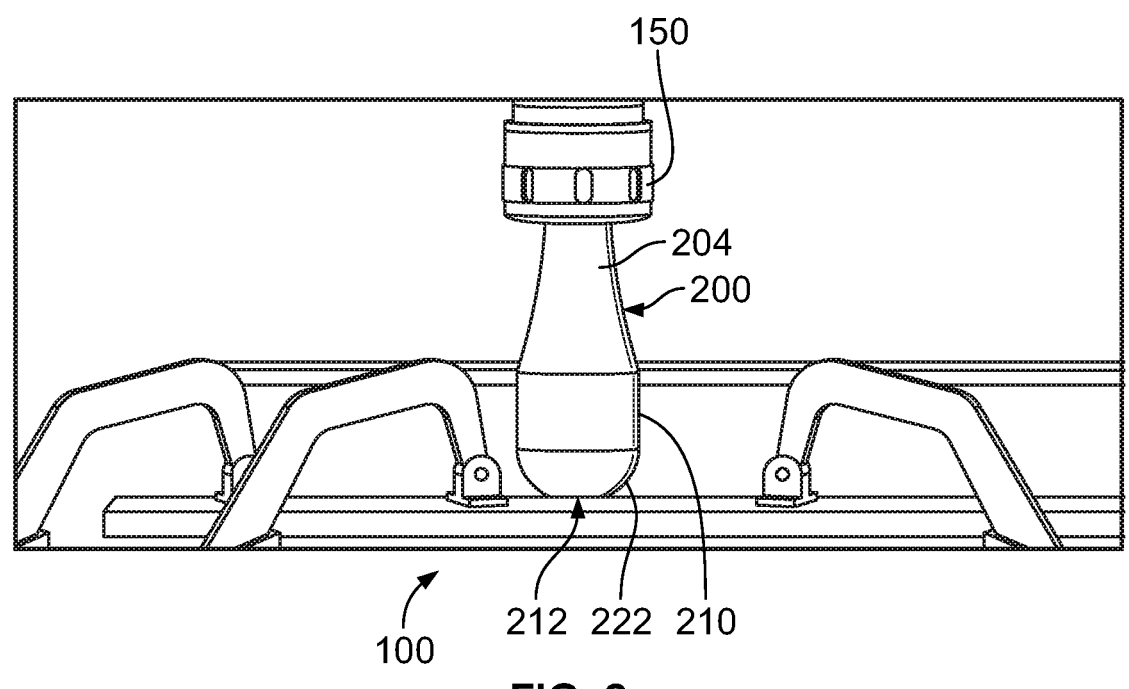
FIG. 2 illustrates a portion of the part forming machine showing the stylus tool in accordance with an exemplary embodiment.
Figure 3:
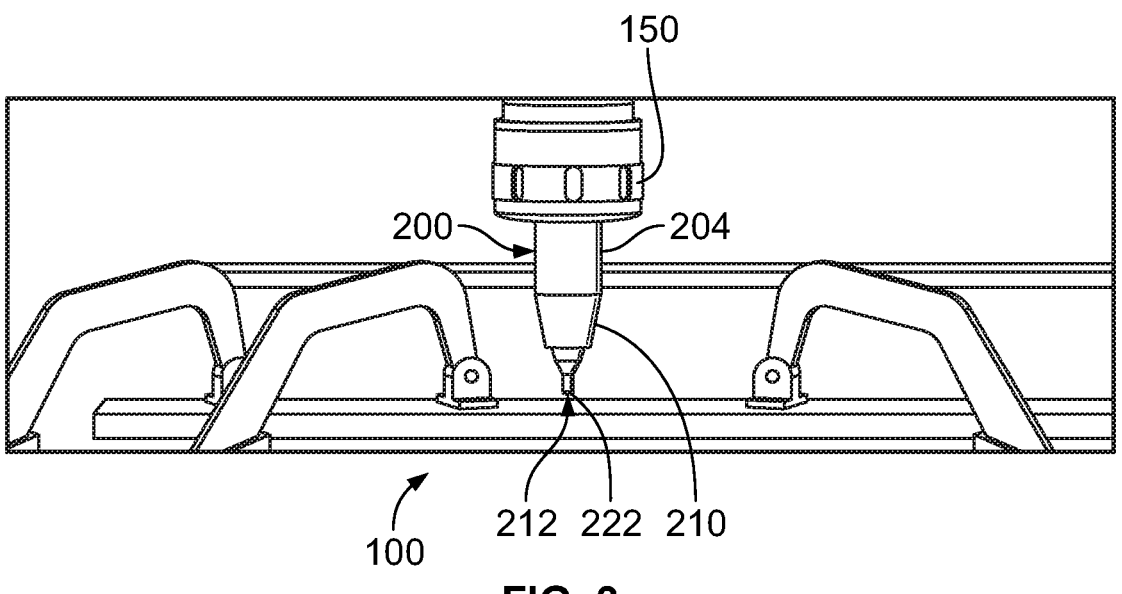
FIG. 3 illustrates a portion of the part forming machine showing the stylus tool in accordance with an exemplary embodiment.

FIG. 2 illustrates a portion of the part forming machine 100 showing the stylus tool 200 in accordance with an exemplary embodiment. FIG. 3 illustrates a portion of the part forming machine 100 showing the stylus tool 200 in accordance with an exemplary embodiment. The stylus tools 200 shown in FIGS. 2 and 3 have the same tool shape; however, the stylus tools 200 have different tool sizes. The stylus tool 200 shown in FIG. 2 has a larger shaft diameter of the base 210 compared to the shaft diameter of the base 210 of the stylus tool 200 shown in FIG. 3. The shanks 204 of the stylus tools 200 are shaped differently to transition to the collet 150. The curved profiles 222 that generate the forming surface 220 have different curve lengths between the tips 212 and the bases 210. The curve lengths are dependent on the tool shape and the tool size.

Figure 4:
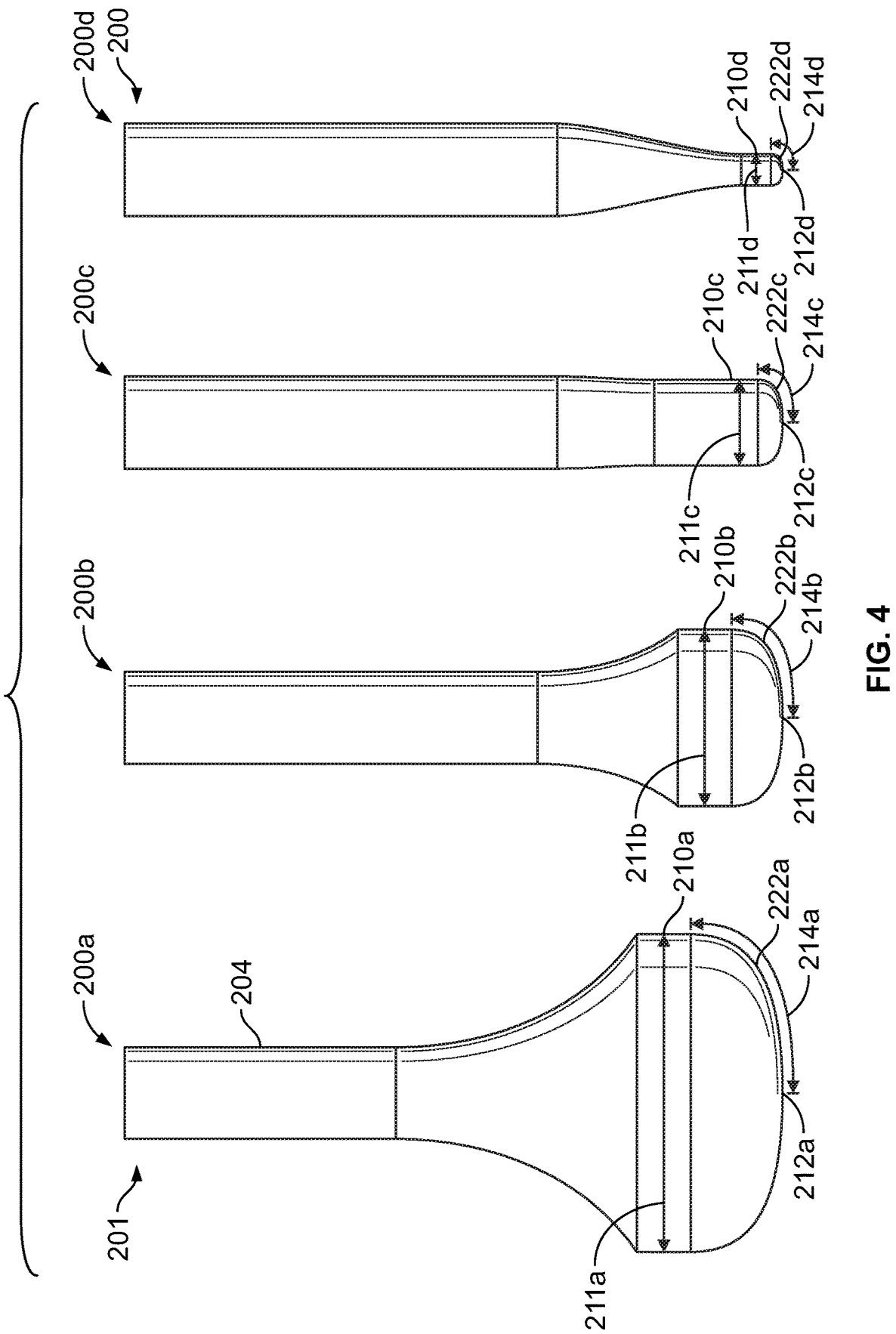
FIG. 4 illustrates a set of stylus tools in accordance with an exemplary embodiment.

FIG. 4 illustrates a set 201 of stylus tools 200 in accordance with an exemplary embodiment. In the illustrated embodiment, the set 201 includes four stylus tools, including a first stylus tool 200a, a second stylus tool 200b, a third stylus tool 200c, and a fourth stylus tool 200d. The stylus tools 200a, 200b, 200c, 200d have the same tool shape; however, the stylus tools 200 have different tool sizes. The first stylus tool 200a has a first shaft diameter 211a of the base 210a. The second stylus tool 200b has a second shaft diameter 211b of the base 210b. The third stylus tool 200c has a third shaft diameter 211c of the base 210c. The fourth stylus tool 200d has a fourth shaft diameter 211d of the base 210d. The shank 204 of each stylus tool 200 may have the same shank diameter for interfacing with the collet 150 (shown in FIG. 1). The curved profiles 222a, 222b, 222c, 222d that are used to generate the forming surfaces have different curve lengths 214a, 214b, 214c, 214d between the tips 212a, 212b, 212c, 212d and the bases 210a, 210b, 210c, 210d of the stylus tools 200a, 200b, 200c, 200d, respectively.

Figure 5:
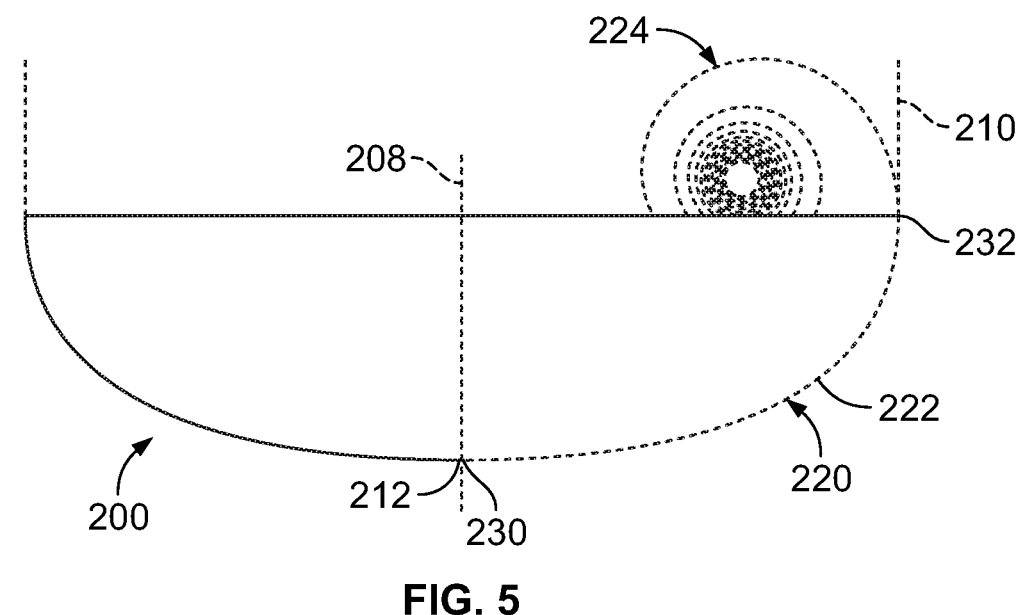
FIG. 5 illustrates a portion of the stylus tool in accordance with an exemplary embodiment.

FIG. 5 illustrates a portion of the stylus tool 200 in accordance with an exemplary embodiment. FIG. 5 illustrates the forming surface 220 of the stylus tool 200. The forming surface 220 is defined by the curved profile 222 between the tip 212 at the tool axis 208 and the base 210 (shown in phantom). The curved profile 222 is a generating curve rotated about the tool axis 208 to define the shape of the forming surface 220. In an exemplary embodiment, the forming surface 220 is non-hemispherical. In an exemplary embodiment, the curved profile 222 is defined by parametric equations having an X-parametric component (radial component) and a Y-parametric component (vertical component).

In the illustrated embodiment, the curved profile 222 is defined by a clothoid 224. The parametric equations of the curved profile 222 are given by the Fresnel integrals. The curved profile 222 has a curvature changing linearly with a curve length of the curved profile 222 of the forming surface 220. The curved profile 222 has a decreasing radius of curvature from the tip 212 to the base 210. For example, the radius of curvature at the tip 212 (for example, at point 230) is larger than the radius of curvature at the end of the curved profile 222 (for example, at point 232). The radius of curvature of the curved profile 222 at the tip 212 may be considered infinite (for example, flat) at the tip 212 in the case of a clothoid. The forming surface 220 resulting from a clothoid profile that is flatter at the bottom than a hemispherical stylus tool of the same shaft diameter. In an exemplary embodiment, the curved profile 222 may be defined by an equation $R*L=A$, where R is radius of curvature, L is the curvilinear distance along the curved profile 222 from the point 230 and A is a scale factor.

Figure 6:
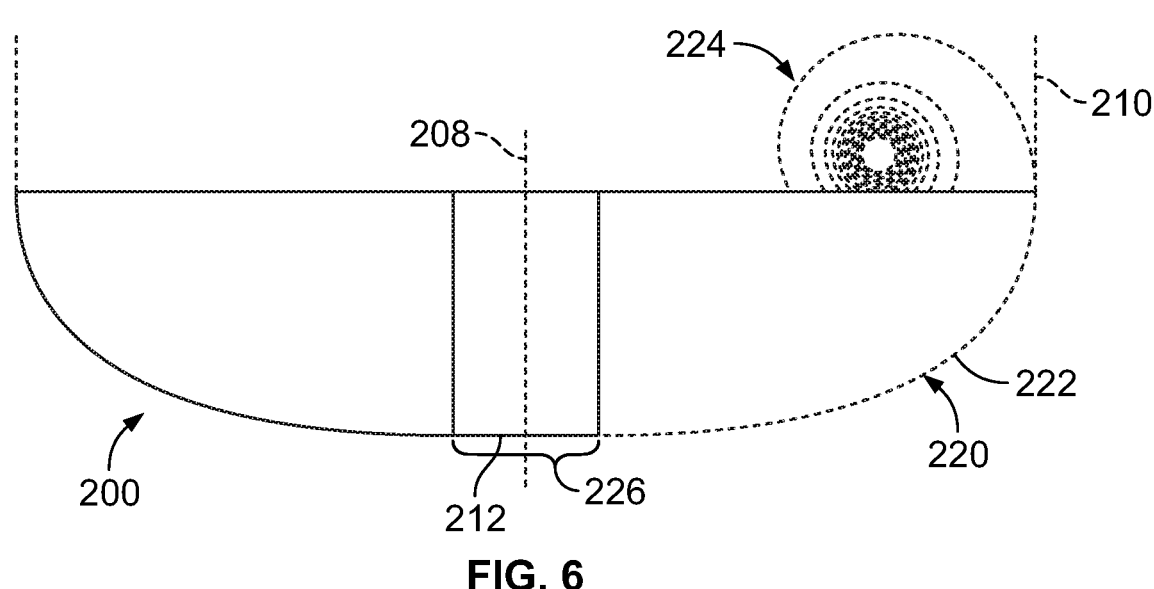
FIG. 6 illustrates a portion of the stylus tool in accordance with an exemplary embodiment.

FIG. 6 illustrates a portion of the stylus tool 200 in accordance with an exemplary embodiment. FIG. 6 illustrates the forming surface 220 of the stylus tool 200 in accordance with an exemplary embodiment. The forming surface 220 is defined by the curved profile 222 between the tip 212 and the base 210 (shown in phantom). In the illustrated embodiment, the tip 212 is flat. The tip 212 includes a flat surface 226. The curved profile 222 is delayed or spaced apart from the tool axis 208. For example, the curved profile 222 is translated radially outward by a small distance to form the flat surface 226 at the bottom of the tool. In an exemplary embodiment, the curved profile 222 is defined by the clothoid 224, which is used to generate the forming surface 220 (e.g., surface of revolution about the axis 208). The curved profile 222 extends between the flat surface 226 and the base 210. The curved profile 222 has a decreasing radius of curvature from the flat surface 226 to the base 210. For example, the curved profile 222 has a radius of curvature which increases from a finite value at the base 210 to become infinitely large at the flat surface 226.

Figure 7:
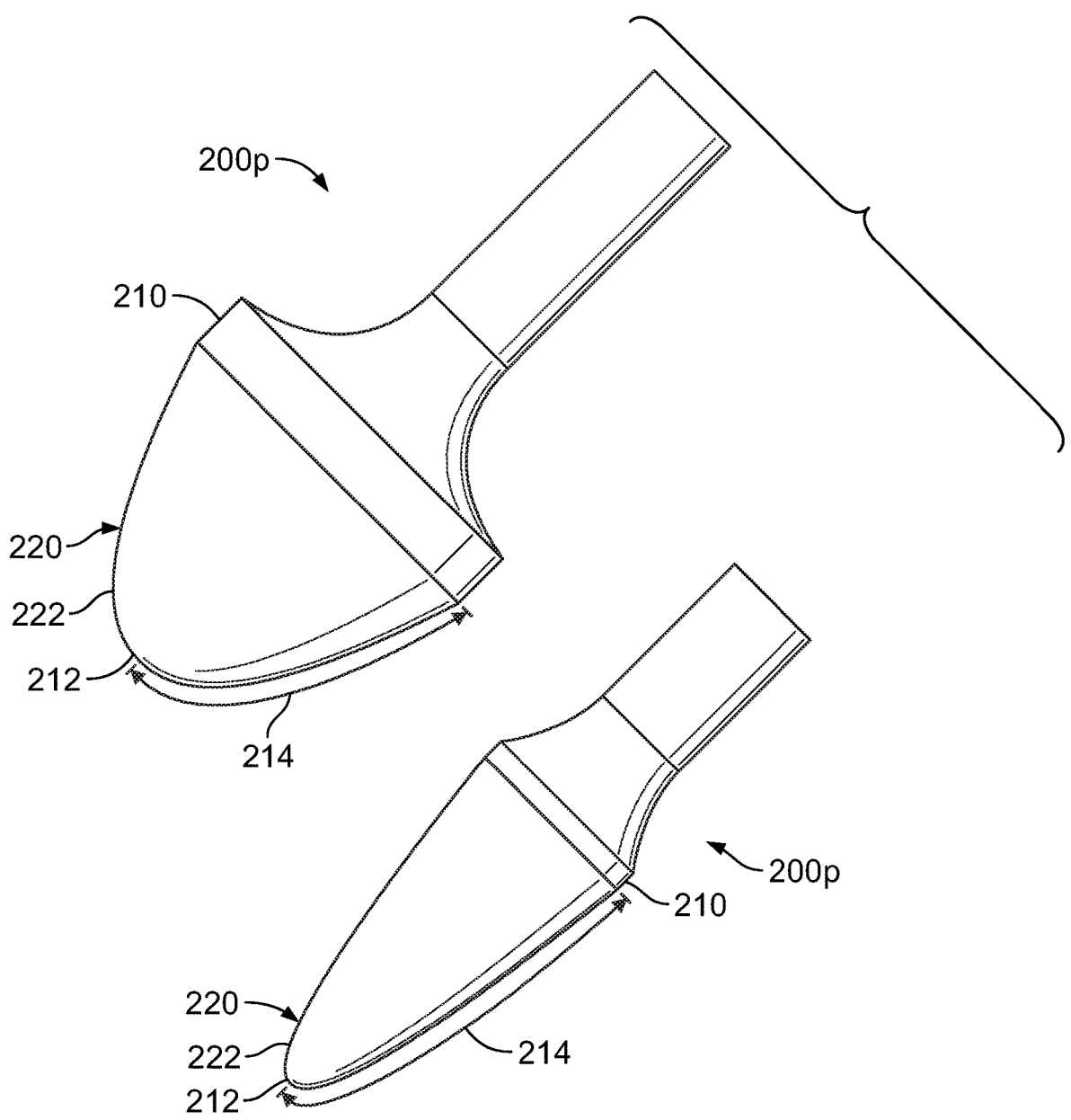
FIG. 7 illustrates a set of stylus tools in accordance with an exemplary embodiment.

FIG. 7 illustrates a set 201p of stylus tools 200p in accordance with an exemplary embodiment having a different tool shape than the stylus tools 200 illustrated in FIG. 4. In the illustrated embodiment, the forming surface 220 of the stylus tools 200p have a parabolic shape. The forming surfaces 220 are defined by the curved profiles 222 between the tip 212 and the base 210. The set 201p includes two stylus tools, both having parabolic shaped curved profiles 222 having different shaft diameters at the bases 210. The curved profiles 222 have different curve lengths 214, which depend on the tool shape and the tool size. The parabolic stylus tools 200p have different focal lengths, which define the different curved profiles 222 and thus the different forming surfaces 220.

Figure 8:
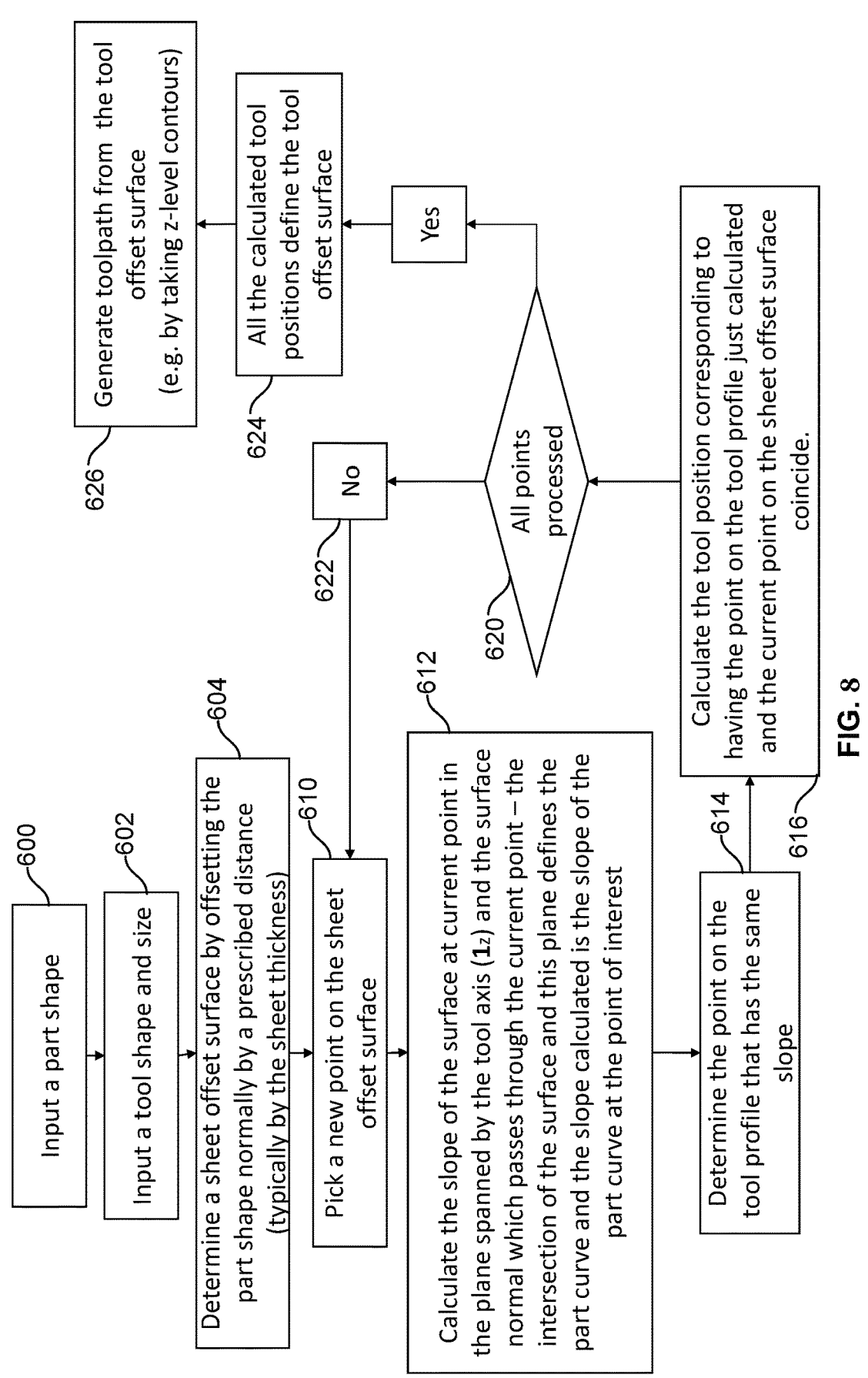
FIG. 8 illustrates a method of generating a toolpath using the toolpath generation module of the part forming machine.

FIG. 8 illustrates a method of generating a toolpath using the toolpath generation module 120 of the part forming machine 100. The toolpath is used for forming the part 102 by a manufacturing process (for example, forming or milling) using the stylus tool 200. The toolpath generation module 120 performs various steps identified in the flow chart to generate a toolpath from forming the part.

At 600, a part shape is input into the toolpath generation module 120. The part shape is a target geometry and orientation of the part 102 to determine the shape of the part being formed. The toolpath generation module 120 may receive a set of contact points (for example, part of the geometry or the entire geometry). The set of contact points may be on planes corresponding to the spirals or steps used for forming the part. The part shape may be input by uploading or selecting a digital file of an object generated by a design program, such as a computer aided design (CAD) program.

At 602, a tool shape and size is input into the toolpath generation module 120. The tool shape is based on the forming surface 220 of the curved profile 222 of the stylus tool 200. The forming surface 220 is axisymmetric. The curved profile 222 of the forming surface 220 is differentiable and bounds a convex region. The toolpath generation module 120 determines a sheet offset surface by offsetting the part shape normally by a prescribed distance. In some embodiments, for example sheet forming operations, this distance may be equal to the thickness of the blank sheet. In other embodiments such as milling this distance may be zero such that no offset from part 102 occurs. The particular stylus tool 200 used in the part forming processes may be selected to improve the geometric accuracy and/or the surface finish of the part 102. For example, the stylus tool is selected to provide a tool shape that reduces or minimizes "oil canning" spring back effects commonly observed in incremental sheet forming processes. The tool shape may be selected based on the shape of the part 102, such as the slope of the surfaces of the part 102, the curvature of the surfaces of the part 102, and the like. The tool shape may be based on the forming surface of the stylus tool 200. The tool shape may be based on the shape of the curved profile. The tool shape may be input into the tool shape input 122 of the toolpath generation module 120. The tool shape may be input by selecting a tool shape from a menu of different tool shapes, which may be selected at the user interface 108. For example, the tool shapes may be selected from a list of tool shapes including part of a circle, part of a clothoid, part of a filleted rectangle, part of a parabola, part of a power law curve, part of an ellipse, or other smooth curves that bound convex regions. The tool shape may be input into a text box at the user interface 108. The tool shape may be input by inputting a mathematical formula associated with the tool shape into the tool shape input 122. The tool size may be based on a diameter of a portion of the stylus tool 200, such as the diameter of the base 210. The tool size may be based on the diameter of the head at the uppermost boundary of the forming surface 220. The tool size may be input into the tool size input 124 of the toolpath generation module 120. The tool size may be input by selecting a tool size from a menu of differ tool sizes, which may be selected at the user interface 108. For example, the tool sizes may be selected from a list (for example, small, medium, large) or may be selected from a dropdown menu of sizes (for example, 10 mm, 20 mm, etc.) The tool size may be input into a text box at the user interface 108. The tool size may affect the mathematical formula associated with the tool shape, such as by affecting constants used within the mathematical formula.

At 610, the toolpath generation module 120 picks a new contact point 410 on the sheet offset surface. At 612, the toolpath generation module 120 calculates the slope of the surface in a vertical plane 412 that contains the normal to part 102 at the contact point 410. The intersection of the surface and the intersecting plane defines the part curve 414 and the slope calculated is the slope of the part curve at the point of interest.

At 614, the toolpath generation module 120 determines a point on the curved profile 222 of the stylus tool 200 having the same slope as the part curve 414 at the contact point 410. At 616, the toolpath generation module 120 calculates the tool offset vector within vertical plane 412 corresponding to having the calculated point on the curved profile 222 and the current contact point 410 on the sheet offset surface coincide. Adding the tool offset vector to the contact point 410 defines a single point on the tool offset surface. This point may be offset from the contact point in a direction normal to the part geometry by an amount equal to the radial offset component of the corresponding point on the curved profile 222 as well as being offset vertically by an amount equal to the vertical offset of the corresponding point on the curve profile 222. The tool offset surface is defined by the set of all points computed in this way from all possible contact points 410 on the surface of part 102. As there are an infinite amount of possible contact points on the part geometry, the tool offset surface is approximated by choosing a plurality of contact points 410 with the surface defined by interpolation through these points. In some embodiments, the contact points may be the entire set of points in a discretized mesh representation of the geometry of the formed or milled surface of part 102. In an alternative embodiment the contact points may be spaced apart at predetermined intervals across the part, such as every 0.1 mm apart forming a grid of contact points along the surface of the part 102. The tool offset surface defines offset positions for locating a reference point of the stylus tool 200 for forming or milling of the part 102. The reference point of the stylus tool 200 may be a fixed point of the stylus tool 200, such as the tip of the stylus tool 200; however, the reference point may be at another location in alternative embodiments. In various embodiments such as those relating to Incremental Sheet Forming, the tool offset surface may be determined by first adding a fixed normal offset at each contact point 410, based on the initial sheet thickness of the sheet used for forming the part.

This initial sheet thickness offset vector is then added to the tool offset vector to define a point on the tool offset surface.

At 620, the toolpath generation module 120 determines if all of the chosen contact points 410 have been processed. At 622, when all of the contact points have not been processed, the toolpath generation module 120 returns to step 610 to pick a new contact point. At 624, when all of the contact points have been analyzed, the toolpath generation module 120 outputs the tool offset positions for each of the contact points as a dataset defining the tool offset surface for forming the part. At 626, the toolpath generation module 120 generates a toolpath by defining a path on the tool offset surface. The toolpath generated by the toolpath generation module 120 may be continuous from the start of the process to the end of the process, as in the case of a spiral toolpath. In alternative embodiments the toolpath generated by the toolpath generation module 120 may be a plurality of contour paths generated by taking slices of the tool offset surface at specific values of the Z coordinate in order to produce a Z level toolpath. In further embodiments, the toolpath generated by the toolpath generation module 120 may be a plurality of contour paths generated by taking slices of the tool offset surface at specific values of the X or Y coordinate values, or any linear combination of these values, in order to produce a lace (zig-zag) toolpath.

In various embodiments, the toolpath generation module 120 is configured to generate a toolpath from the surface of the part 102 by generating an appropriate offset with reduced 3D processing compared to conventional toolpath generation algorithms. In various embodiments, the toolpath generation module 120 may operate using assumptions to simplify the calculation of the tool offset point from the target surface of the part. For example, the toolpath generation module 120 may use the assumption that the forming surface 220 of the stylus tool 200 is axisymmetric, which allows for solving the tool offset surface for a given point to be done in two-dimensional space, reducing the algorithmic complexity while increasing the efficiency of the tool-path generation. The toolpath generation module 120 may use the assumption that the curved profile 222 is differentiable and bounds a convex region in the plane. In various embodiments, the toolpath generation module 120 may generate the toolpath for a discretely defined forming surface (for example, using a discrete set of points to define the generating curve) and/or a parametrically defined forming surface.

Figure 9:
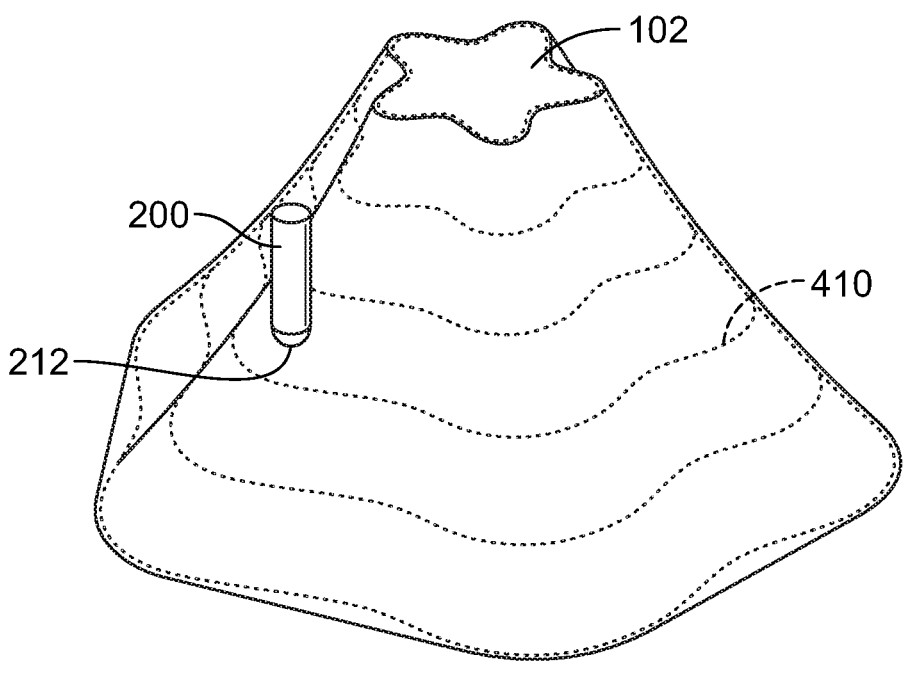
FIG. 9 illustrates a model of a toolpath for the part in accordance with an exemplary embodiment.
Figure 10:
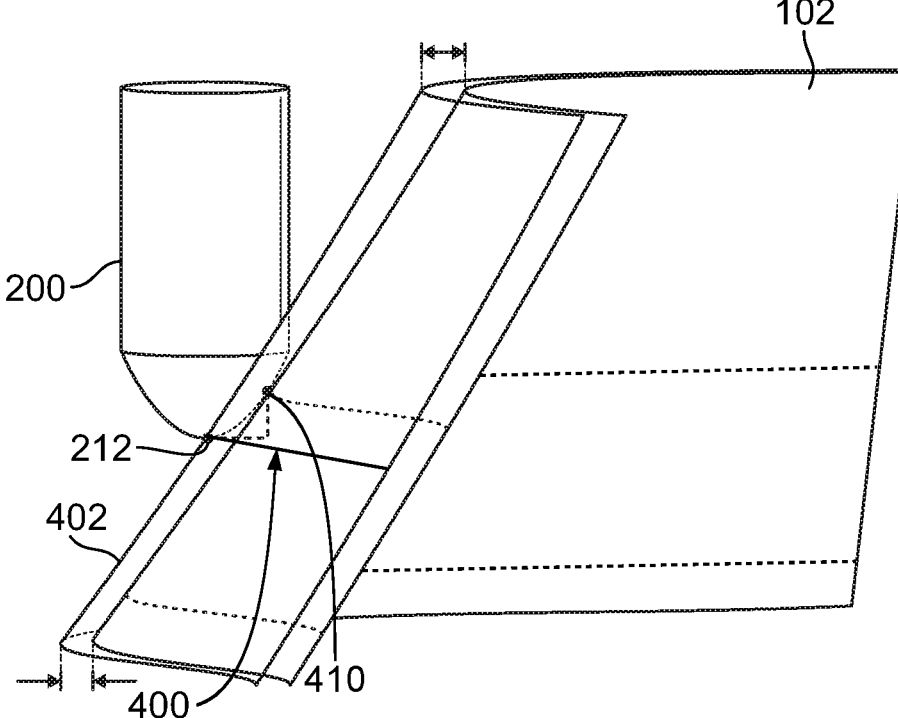
FIG. 10 is an enlarged view of a portion of the model of the toolpath for the part in accordance with an exemplary embodiment.

FIG. 9 illustrates a model of the stylus tool positioned in relation to part 102 in accordance with an exemplary embodiment. The dashed lines 410 show traces of the contact points. FIG. 10 is an enlarged view of a portion of the model of the stylus tool positioned in relation to part 102 in accordance with an exemplary embodiment. The toolpath 400 is used for forming the part 102 using the stylus tool 200. The stylus tool 200 follows the toolpath 400. The toolpath 400 is specific to the part 102 being formed. The dashed lines 410 show traces of the contact points as the tool 200 follows the toolpath 400. The toolpath is located at a tool offset surface 402 from the part 102. The tool offset surface 402 may be defined relative to the tip 212 of the stylus tool 200. The tool offset surface 402 is based on the shape of the stylus tool 200. The tool offset surface 402 is based on the slope and surface normal of the part at the contact points. The tool offset surface 402 is also based on the sheet thickness of the sheet used for forming the part 102. Points on the tool offset surface 402 may be shifted in an X direction and/or a Y direction and/or a Z direction from the contact point 410.

Figure 11:
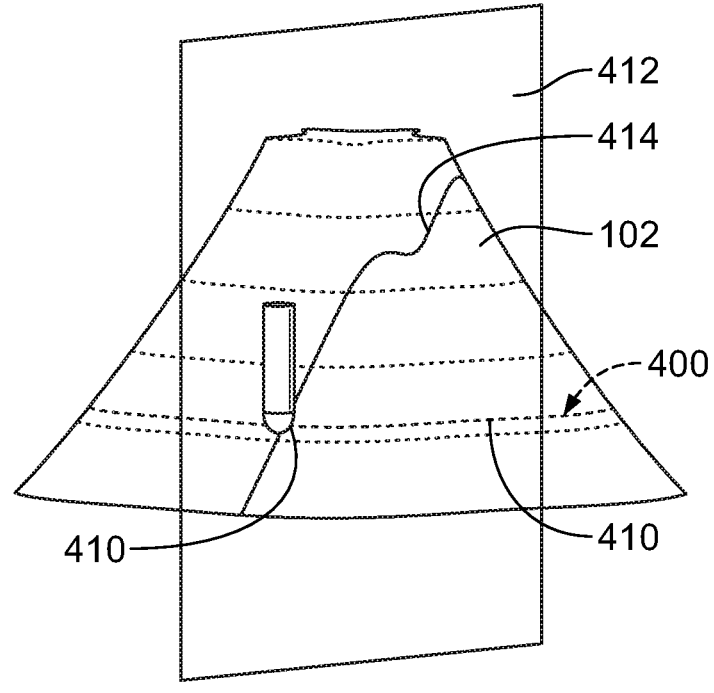
FIG. 11 illustrates a model of the toolpath for the part in accordance with an exemplary embodiment.

FIG. 11 illustrates a model of the toolpath 400 for the part 102 in accordance with an exemplary embodiment. The toolpath generation module 120 identifies a plurality of contact points 410 on the part. At each contact point 410, the toolpath generation module 120 defines a vertical plane 412 that contains the normal to part 102 at contact point 410 to define a part curve 414 of the part within the vertical plane. The toolpath generation module 120 may identify multiple points of contact along the part curve 414.

Figure 12:
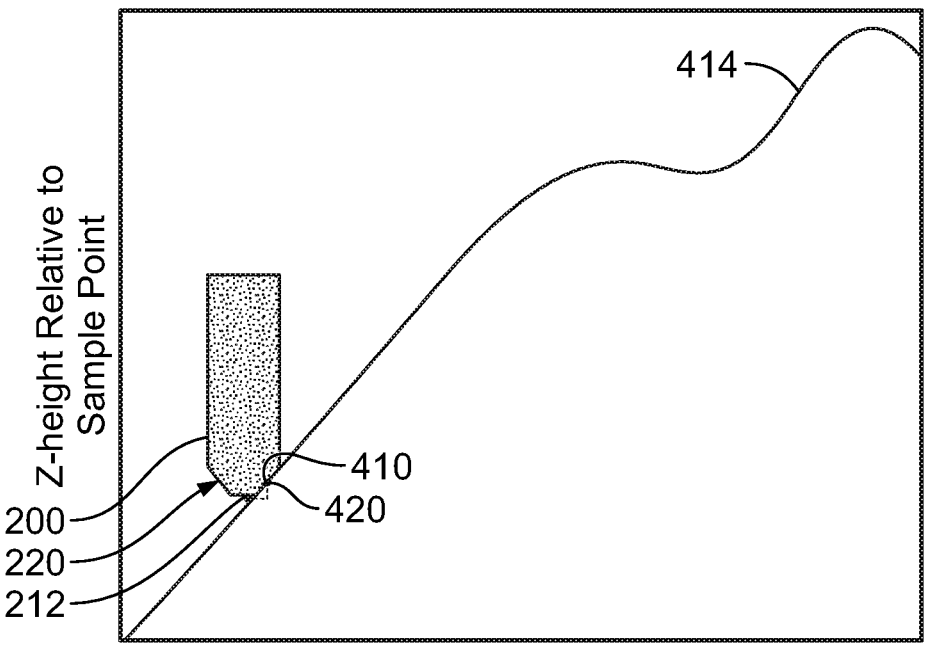
FIG. 12 is a graph showing tool offset surface determined by the toolpath generation module in accordance with an exemplary embodiment.

FIG. 12 is a graph showing tool offset surface determined by the toolpath generation module 120 in accordance with an exemplary embodiment. FIG. 12 illustrates the part curve 414 and the stylus tool 200 at the tool offset position for forming the part. To determine a point on the tool offset surface, the toolpath generation module 120 calculates a derivative of the part curve 414 at the contact point 410. The toolpath generation module 120 determines a tool contact point 420 on the profile curve 222 of the stylus tool 200 such that the corresponding point on the part curve 414 has the same derivative value as the corresponding contact point 410. The stylus tool position for forming the part 102 at the contact point 410 is at the tool offset position. The tool offset position is based on the particular tool shape and the particular tool size. The tool offset position may be an offset of the tool contact point 410 from the tip 212 and may have an X offset and/or a Y offset and/or a Z offset.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A stylus tool for forming a part, the stylus tool comprising:
a shank configured to be coupled to a collet for positioning of the stylus tool; and
a head extending between a base at the shank and a tip, the head having a convex forming surface between the base and the tip, the convex forming surface being axisymmetric and defined by rotating a curved profile around an axis of the shank, the convex forming surface being an uninterrupted surface of revolution generated by revolving the curved profile around the axis, the curved profile having a convex curvature changing linearly with a curve length of the curved profile of the convex forming surface, wherein the curved profile of the convex forming surface is part of a clothoid.

2. The stylus tool of claim 1, wherein the curved profile is smooth and continuous from the axis to form a smooth and continuous convex forming surface about the axis, the head having a circular cross section about the axis.

3. The stylus tool of claim 1, wherein the curved profile has a decreasing radius of curvature from the tip to the base.

4. The stylus tool of claim 1, wherein the curved profile is defined by an equation R*L=A, where R is radius of curvature, L is curvilinear distance along the curved profile from the tip and A is a scale factor.

5. The stylus tool of claim 1, wherein the head includes a flat surface at the tip, the curved profile extending between the flat surface and the base.

6. A toolpath generation method using a toolpath generation module of a part forming machine for generating a toolpath using a stylus tool, the toolpath generation method comprising:
inputting a part shape of a part to be manufactured;
inputting a tool shape of the stylus tool based on a convex forming surface of a head of the tool between a tip of the head and a base of the head defined by revolving an uninterrupted curved profile around an axis of the stylus tool, the curved profile having a convex curvature changing linearly with a curve length of the curved profile of the convex forming surface, the head of the tool having a circular cross-section about the axis, wherein the curved profile of the convex forming surface is part a clothoid;
determining a tool offset surface for the part shape based on the tool shape; and
generating the toolpath for forming the part based on the tool offset surface.

7. The toolpath generation method of claim 6, wherein inputting the tool shape comprises inputting a diameter of the base into the toolpath generation module.

8. The toolpath generation method of claim 6, wherein determining the tool offset surface comprises determining the tool offset surface at a plurality of contact points of part.

9. The toolpath generation method of claim 8, wherein determining the tool offset surface comprises:
defining a vertical plane through the part at each of the contact points, where the plane also contains the normal to the part at that contact point, to define a part curve of the part within the vertical plane;
calculating a derivative of the part curve at each of the contact points; and
for each of the contact points, determining a point on the curved profile which generates the forming surface of the tool having the same derivative value as said contact point.

10. The toolpath generation method of claim 9, wherein generating the toolpath comprises generating a toolpath between specified points on the tool offset surface corresponding to desired tool contact points to form the toolpath.

11. The toolpath generation method of claim 6, wherein determining the tool offset surface comprises adding a fixed offset for each contact point based on sheet thickness of a sheet used for forming the part.

12. A toolpath generation method using a toolpath generation module of a part forming machine for generating a toolpath using a stylus tool, the toolpath generation method comprising:
inputting a part shape of a part to be manufactured;

inputting a tool shape of the stylus tool based on a convex forming surface of a head of the stylus tool between a tip of the head and a base of the head defined by a curved profile, the curved profile being differentiable and bounding a convex region, the convex forming surface being axisymmetric for forming of the part, the convex forming surface being defined by an uninterrupted surface of revolution generated by revolving a curved profile around the axis of the stylus tool, the curved profile having a convex curvature changing linearly with a curve length of the curved profile of the convex forming surface, the head of the tool having a circular cross-section about the axis, wherein the curved profile of the convex forming surface is part of a clothoid;

inputting a tool size of the base of the head of the stylus tool;

determining a tool offset surface for the part shape based on the tool shape and the tool size; and generating the toolpath for forming the part based on the tool offset surface and the part shape.

13. The toolpath generation method of claim 12, wherein inputting the tool shape comprises inputting the tool shape from a plurality of different tool shapes.

14. The toolpath generation method of claim 12, wherein determining the tool offset surface comprises determining the tool offset surface using a plurality of contact points of part.

15. The toolpath generation method of claim 12, wherein inputting the tool shape comprises inputting an enveloping shape of a cutting tool.

16. The toolpath generation method of claim 12, wherein inputting a tool shape comprises inputting a pressing tool shape.

17. The toolpath generation method of claim 12, wherein determining the sheet offset surface comprises adding a fixed offset for each contact point based on sheet thickness of a sheet used for forming the part.

18. A part forming machine comprising:

a collet;

a tool positioner operably coupled to the collet to move the collet in a three dimensional working space;

a controller operably coupled to the tool positioner for controlling a position of the collet in the working space, the controller including a toolpath generation module for generating a toolpath for forming of a part; and a stylus tool coupled to the collet for forming the part, the stylus tool including a tool body extending between a shank and a head, the shank being coupled to the collet, the head extending between a base at the shank and a tip, the head having a convex forming surface between the base and the tip, the convex forming surface being axisymmetric for forming of the part, the convex forming surface being defined by a curved profile having a convex curvature being differentiable and bounding a convex region, the convex forming surface being defined by rotating a curved profile around an axis of the shank, the convex forming surface being an uninterrupted surface of revolution generated by revolving the curved profile around the axis, the curved profile having a convex curvature changing linearly with a curve length of the curved profile of the convex forming surface, the head having a circular cross section about the axis, wherein the curved profile of the convex forming surface is part of a clothoid;

wherein the toolpath generation module determines the toolpath for the stylus tool based on a tool shape of the stylus tool defined by the convex forming surface.

19. The part forming machine of claim 18, wherein the tool shape may be any of a plurality of different tool shapes.

20. The part forming machine of claim 18, wherein the toolpath generation module determines the toolpath for the stylus tool based on a tool size in addition to the tool shape of the stylus tool defined by the forming surface, the tool size may be any of a plurality of different tool sizes for a given tool shape.

21. The part forming machine of claim 18, wherein the curved profile which generates the forming surface is smooth and continuous from the axis to form a smooth and continuous convex forming surface about the axis.

22. The part forming machine of claim 18, wherein the curved profile which generates the forming surface has a curvature changing linearly with a curve length of the curved profile which generates the forming surface.

23. The part forming machine of claim 18, wherein the head includes a flat surface at the tip, the curved profile extending between the flat surface and the base.

24. A part forming machine comprising:

a collet;

a tool positioner operably coupled to the collet to move the collet in a three dimensional working space;

a controller operably coupled to the tool positioner for controlling a position of the collet in the working space, the controller including a toolpath generation module for generating a toolpath for forming of a part; and a stylus tool coupled to the collet being movable by the collet for forming the part, the stylus tool including a tool body extending between a shank and a head, the shank being coupled to the collet, the head extending between a base at the shank and a tip, the head having a convex forming surface between the base and the tip, the convex forming surface being axisymmetric for forming of the part, the convex forming surface being defined by an uninterrupted surface of revolution generated by revolving a curved profile around an axis of the shank, the curved profile having a convex curvature changing linearly with a curve length of the curved profile of the convex forming surface, wherein the curved profile of the convex forming surface is part of one of a clothoid, a filleted rectangle, a parabola, or an ellipse;

wherein the toolpath generation module determines the toolpath for the stylus tool based on a tool shape of the stylus tool defined by the convex forming surface.

25. The part forming machine of claim 24, wherein the toolpath generation module determines the toolpath for the stylus tool based on a tool size of the stylus tool defined by a diameter of the base, the tool size may be any of a plurality of different tool sizes for a given tool shape.

26. The part forming machine of claim 24, wherein the curved profile which generates the forming surface is smooth and continuous from the axis to form a smooth and continuous convex forming surface about the axis, the head having a circular cross section about the axis.

27. The part forming machine of claim 24, wherein the curved profile of the forming surface is part of a clothoid.

28. The part forming machine of claim 24, wherein the head includes a flat surface at the tip, the curved profile extending between the flat surface and the base.

* * * * *